(12) United States Patent
DeYoung

(10) Patent No.: US 8,430,013 B1
(45) Date of Patent: Apr. 30, 2013

(54) BRAIDING MACHINE

(76) Inventor: Simon Arden DeYoung, Middlefield, OH (US)

( * ) Notice: Subject to any disclaimer, the term of this patent is extended or adjusted under 35 U.S.C. 154(b) by 146 days.

(21) Appl. No.: 12/977,135

(22) Filed: Dec. 23, 2010

Related U.S. Application Data

(60) Provisional application No. 61/289,592, filed on Dec. 23, 2009.

(51) Int. Cl.
*D04C 3/14* (2006.01)

(52) U.S. Cl.
USPC .............................................. 87/55

(58) Field of Classification Search ............... 87/55, 62
See application file for complete search history.

(56) References Cited

U.S. PATENT DOCUMENTS

| | | | |
|---|---|---|---|
| 881,475 A | 3/1908 | Korting | |
| 1,170,973 A | 2/1916 | Kappeler | |
| 1,330,323 A | 2/1920 | Kappeler | |
| 1,499,830 A | 7/1924 | Krissiep | |
| 2,148,164 A | 3/1939 | Krippendorf | |
| 2,788,700 A | 4/1957 | Corssley et al. | |
| 3,748,952 A | 7/1973 | Petzetakis | |
| 3,783,736 A | 1/1974 | Richardson | |
| 3,981,223 A | 9/1976 | Ostermann | |
| 4,034,642 A | 7/1977 | Iannucci et al. | |
| 4,059,892 A * | 11/1977 | Siden | 30/90.1 |
| 4,084,479 A | 4/1978 | Ratera | |
| 4,158,984 A | 6/1979 | Griffiths | |
| 4,275,638 A | 6/1981 | DeYoung | |
| 4,719,838 A * | 1/1988 | DeYoung | 87/57 |
| 4,847,854 A * | 7/1989 | Van Dijk | 372/92 |
| 4,913,028 A | 4/1990 | Yoshiya | |
| 5,085,121 A | 2/1992 | Richardson | |
| 5,146,836 A | 9/1992 | DeYoung | |
| 5,186,092 A | 2/1993 | DeYoung | |
| 5,220,859 A | 6/1993 | DeYoung | |
| 5,257,571 A | 11/1993 | Richardson | |
| 5,749,280 A | 5/1998 | Scherzinger | |
| 5,931,077 A | 8/1999 | DeYoung | |
| 6,360,644 B1 | 3/2002 | Bettger | |
| 2008/0292418 A1 * | 11/2008 | Kay et al. | 408/238 |

* cited by examiner

*Primary Examiner* — Shaun R Hurley
(74) *Attorney, Agent, or Firm* — Fay Sharpe LLP

(57) ABSTRACT

A braiding machine is provided comprising a support member, a series of drivers carried by the support member arranged in a circle around a braiding point, a mechanism to rotate adjacent of the drivers in opposite directions, a series of strand supply carrier spindles, and a plurality of cars for mounting of an associated spindle to be driven by the drivers for travel in serpentine intersecting paths in opposite directions around the braiding point. Each of the plurality of cars comprises a unitary central post, a mounting base, and a foot. The post extends from a bottom plane surface of the foot through the foot and the mounting base. The foot and the mounting base are spaced from one another and both provide support to the post.

25 Claims, 6 Drawing Sheets

BRAIDING MACHINE

This application claims the priority benefit of U.S. provisional application Ser. No. 61/289,592, filed Dec. 23, 2009, the disclosure of which is incorporated herein by reference.

BACKGROUND

The disclosure is directed to improvements in maypole braiders, and similar machines, as employed in the reinforcement of hose or the like and further used in the manufacture of ropes, hoses, and other products. The braiders typically being of the type employing a plurality of strand supply carrier spindles moving in serpentine paths around the braiding point. The driver means for the carrier spindles can include rotors or horn gears with successive rotors rotating in opposite directions.

Braiding machines have long been used in industry, for example, to braid wire (either metallic or non-metallic) into electrical or electronic cable as a protective armor, or into hydraulic hose and cordage as a load bearing structure, or into rope as a strength improving mechanism.

One of such braiding machines has been known as a maypole type machine wherein strand carrying assemblies each carrying a bobbin are moved by horn gears or notched rotors on a deck with all of the strand carrying assemblies following alternating semi-circular or arcuate paths around the braiding point. Half the strand carrying assemblies travel in one direction around the braiding point following one alternating path while the other half of the strand carrying assemblies travel in the opposite direction around the braiding point following another alternating path which crosses the first path at each alternating direction. As the two sets of strand carrying assemblies travel in opposite directions around the braiding point each crossing the path of the other, strands leaving the bobbins are interwoven as they converge to the braiding point. With such maypole type braiders, the bobbins are normally rotatably mounted on an axis perpendicular to the path of movement of the strand carrying assemblies and parallel to the axis of the workpiece. As such, during one half of the time, each bobbin is moving radially away from the workpiece and the other half of the time radially towards the workpiece at a rate sometimes faster than the strand is being taken up by the workpiece.

Associated with each bobbin is a strand carrying assembly. The strand carrying assembly or carrier is carried by a "car" and includes both a tension controlling mechanism and a clutch mechanism. The tension controlling mechanism functions to maintain a constant tension on the strand as it leaves the bobbin and converges to the braiding point notwithstanding the movement of the bobbin toward and away from the workpiece. The clutch mechanism restrains the bobbin from rotating and dispensing a strand and periodically releases the bobbin when the tension controlling mechanism reaches the limit of its operation. Release of the bobbin permits additional strand to be unwound from the bobbin and withdrawn from the strand carrier through the tension controlling mechanism.

In these machines, the bobbin and associated mechanisms are subjected to two different types of forces as the car moves from one semi-circular path to the other; namely, constantly reversing rotational forces about the bobbin axis and constantly reversing centrifugal forces on the cantilevered portion of the assembly. These constantly reversing forces create large stresses in the various parts of the braiding machine, which if too high will ultimately fatigue the materials resulting in cracks forming, and if the cracks are not discovered in time, will result in breakage and damage to the entire machine. These stresses are a square function of the speed of rotation of the cars around the workpiece. The maximum speed of braiding is severely limited by the need to limit this speed of rotation and thus the rate of braiding the workpiece.

Due to the high reversing rotational and centrifugal forces on the bobbin and car assemblies, failures occur if extremely strict maintenance and lubrication procedures are not followed. In some cases failed parts between other moving parts, i.e. the mounting arrangement and design for the cars, cause an entire wipe-out of the braider. Such wipe-outs are extremely expensive not only in the repair of the parts, but in the down time required to repair the braider and its intended braiding operation.

A further problem with existing maypole type braiders has been the time required to replace a bobbin, or carrier, when its strand has been entirely dispensed. With existing machines it has been necessary to stop the machine, remove the bobbin, install a new bobbin, and then guide its strand through the tension controlling mechanism to the workpiece. Advancing the strand through the take-up mechanism while the carrying assembly is in the braider consumes a substantial amount of time, which in a 24 or 32 strand braider can add up to a substantial amount of down time.

Other disadvantages of existing strand carriers arise in the tension controlling mechanisms. In order to fit on a car adjacent the bobbin and other components the tension controlling mechanism is a laterally compact, generally elongated structure fixed at one end to the car. A strand roller is slidable in a guideway extending the length of the structure and is spring biased toward the car end. The strand extends from the bobbin laterally across the car to the sliding strand roller, which turns the strand to extend toward the other end where it exits the carrier. Tension in the strand extending around the sliding strand roller urges the roller against the spring biasing force. A generally constant rate of strand output from the carrier is maintained by sliding movement of the strand roller in the guideway as permitted by the spring biasing force in response to changes in external strand tension. Sliding strand rollers are known to comprise a pulley mounted on an axle extending laterally from a shoe or follower carried in the guideway. This arrangement causes strand tension at the pulley to transmit a bending moment through the axle and into the shoe, which is then undesirably forced against the sides of the guideway instead of being forced only in the direction of movement along the guideway. An imbalance of forces at the sliding strand roller causes friction which not only decreases efficiency of operation, but also results in overheating of the machine despite efforts to lubricate the frictionally engaged moving parts. Furthermore, sliding strand rollers are known to hesitate or jam in the guide way and thus fail to maintain the desired tension in the strand, which if too high can break either the strand or the machine, and if too low causes slack to become entangled in other strands or moving parts.

U.S. Pat. Nos. 6,360,644, 4,719,383 4,719,838, 3,981,223, 3,783,736, incorporated herein by reference, are provided for background and for detailed operation of a maypole type braider.

SUMMARY

The present disclosure provides a braiding machine, comprising a support member, a series of drivers carried by the support member arranged in a circle around a braiding point, a mechanism to rotate adjacent of the drivers in opposite directions, a series of strand supply carrier spindles and a plurality of cars for mounting of an associated spindle to be driven by the drivers for travel in serpentine intersecting paths in opposite directions around the braiding point, wherein each of the plurality of cars comprise a unitary central post, a mounting base, and a foot. The post extends from a bottom plane surface of the foot through the foot and the mounting base, wherein the foot and the mounting base are spaced from one another and both provide support to the post. The car is formed from heat treated steel and includes a hardness from about 20 C to about 30 C Rockwell. The car is machined to a specification from the heat treated steel and then treated to another heat treating operation. The another heat treating operation includes nitriding for increased surface hardness and tolerance adherence of the car. The surface hardness is at least 60 C.

In another aspect, the present disclosure provides a method of forming support members for a braiding machine, comprising: forming a unitary steel support member from heat treated steel; and, machining the unitary support member to a specification including a central post, a mounting base, and a foot. The post extends from a bottom plane surface of the foot through the foot and the mounting base, wherein the foot and the mounting base are spaced from one another and both provide support to the post. The method further comprises treating the unitary support member to a nitriding process, after the machining, to increase surface hardness wherein the surface hardness includes a Rockwell hardness of at least 60 C; and, the nitriding process includes a ferritic nitrocarburizing (FNC) process at a processing temperature from about 525 degrees Celsius to about 650 degrees Celsius.

In yet a further aspect, the present disclosure provides a method of lubricating a braiding machine, comprising providing a lubrication system for introducing oil into each bearing housing having an associated spindle wherein the oil is introduced in between tapered roller bearings and is metered into each spindle. The method further comprises providing an open bearing system wherein the oil leaves through the bearing in the front and onto a track, and wherein the oil leaves through the bearing in the back and onto a back gear. The oil travels axially through the bearings. The method still further comprises distributing the oil through at least one manifold including a plurality of lubricant feeds, wherein each lubricant feed provides a supply of oil to each horn gear assembly via an associated bearing housing. The lubrication system comprises an open system including a collection tray at the bottom of the frame for collecting the oil.

In still a further aspect, the present disclosure provides a method of reducing friction in a braiding machine, comprising: providing a lubrication system for Introducing oil into each bearing housing having an associated spindle wherein the oil is introduced in between tapered roller bearings and the oil is metered into each spindle; providing an open bearing system wherein the oil leaves through the bearing in the front and onto a track, and wherein the oil leaves through the bearing in the back and onto a back gear; and, distributing the oil through at least one manifold including a plurality of lubricant feeds, wherein each lubricant feed provides a supply of the oil to each horn gear assembly via an associated bearing housing. The lubrication system comprises an open system including a collection tray at the bottom of the frame for collecting the oil. The method further comprises forming a unitary steel support member from heat treated steel; machining the unitary support member to a specification including a unitary central post, a mounting base, and a foot. The post extends from a bottom plane surface of the foot through the foot and the mounting base, wherein the foot and the mounting base are spaced from one another and both provide support to the post. The method still further comprises treating the unitary support member to a nitriding process, after the machining, to increase surface hardness wherein the surface hardness includes a Rockwell hardness of at least 60 C.

Further in accordance with the disclosure, means are provided for supporting the assembly on the car of a braiding machine freely rotatable on the axis of the bobbin.

An object of the present disclosure is to provide an improved mounting arrangement for the strand carrier for a braiding machine which enables the braiding machine to operate at greater speeds and with less down time for service.

Another object of the disclosure is to provide a mounting arrangement and lubrication system which minimizes the frictional forces produced within the carrier and car and transmitted to a braiding machine as the strand carrier is revolved around a workpiece by the braiding machine.

Another object of the disclosure is to provide a mounting arrangement for the carriers which are comprised of a unitary component in order to increase durability and to reduce service time at a carrier location on a braiding machine.

Another object of the disclosure is to provide a mounting and driving arrangement for the carriers which are comprised of hardened components for increased durability so as to reduce service time at a carrier location on a braiding machine.

Further objects and advantages of the disclosure will become apparent from the following detailed description of embodiments thereof and from the accompanying drawings.

DETAILED DESCRIPTION

The present disclosure provides a braiding system that integrates a modular carrier and a braiding deck that maximizes the performance and value of both while incorporating simplicity, flexibility, and durability. The braiding system to be described hereinafter improves speed, durability, lubrication, and overall machine run time of braiding systems heretofore developed.

Figure 1:
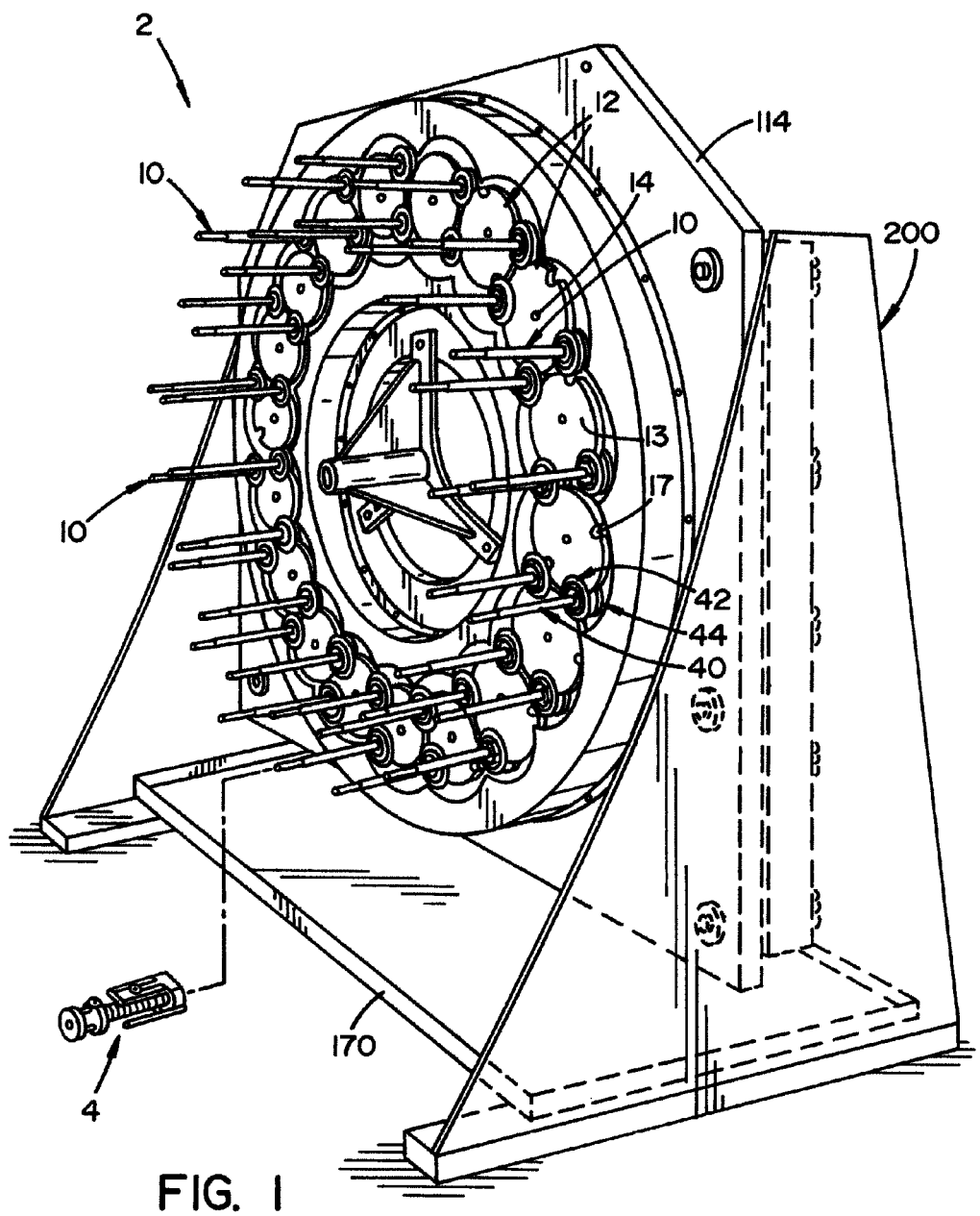
FIG. 1 is a side perspective view showing the horn gears and cars mounted to the deck plate according one embodiment of the disclosure.

FIG. 1 shows a perspective view a braiding machine 2, and an exemplary strand carrying assembly or carrier 4. Strand carriers 4 are transported on 'cars' 10 and shoes 8 by braiding machine 2 in generally circumferential paths around a workpiece (not shown) by notched rotors or horn gears 12. Rotors 12 are disposed in a circumferential series and rotate about rotor axes 14 each in a direction opposite to an adjacent rotor. It is to be appreciated that pairs of strand carriers 4 are moved in opposite directions by a rotor 12 with one strand carrier 4 following a semi-circular path along one side of a rotor, and with another strand carrier 4 moving oppositely in a semi-circular path around the other side of the same rotor. Each car 10, along with an associated strand carrier 4, is released from a rotor 12 by guiding shoes 8 from one rotor 12 at the end of each semi-circular path simultaneously to another 'next' adjacent rotor 12 to follow an alternate semi-circular path therearound. Successive alternate semi-circular paths taken by each car 10 around successive rotors complete a revolution by the mounted strand carriers around the workpiece, with oppositely moving strand carriers controllably releasing strands under tension to form a braided pattern of strands wrapped around the workpiece (not illustrated).

Figure 2:
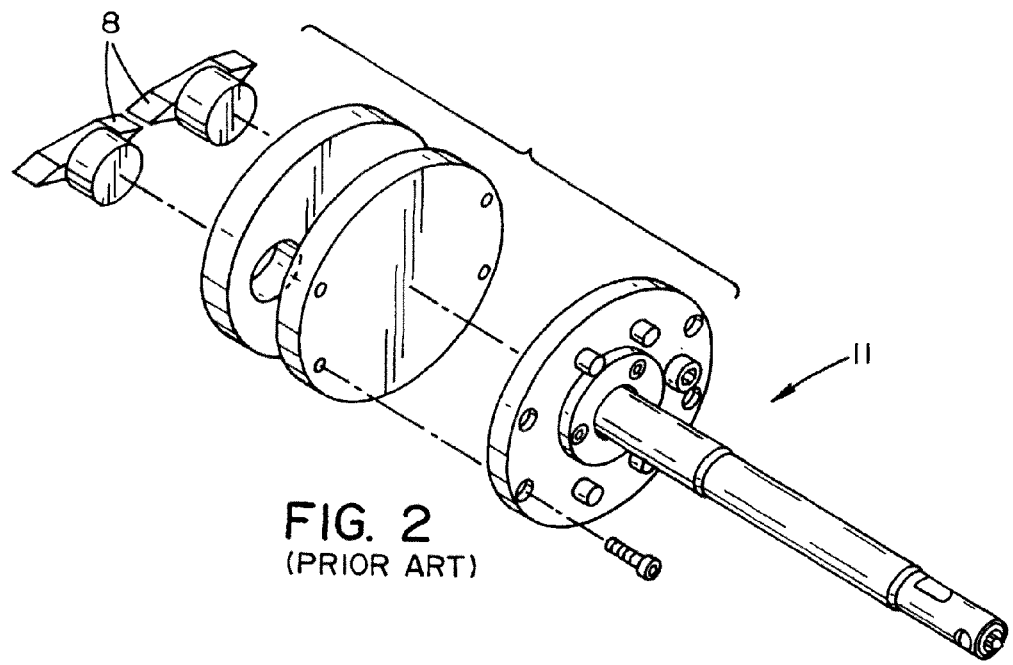
FIG. 2 is a multi-piece 'car' design according to the prior art.
Figure 3:
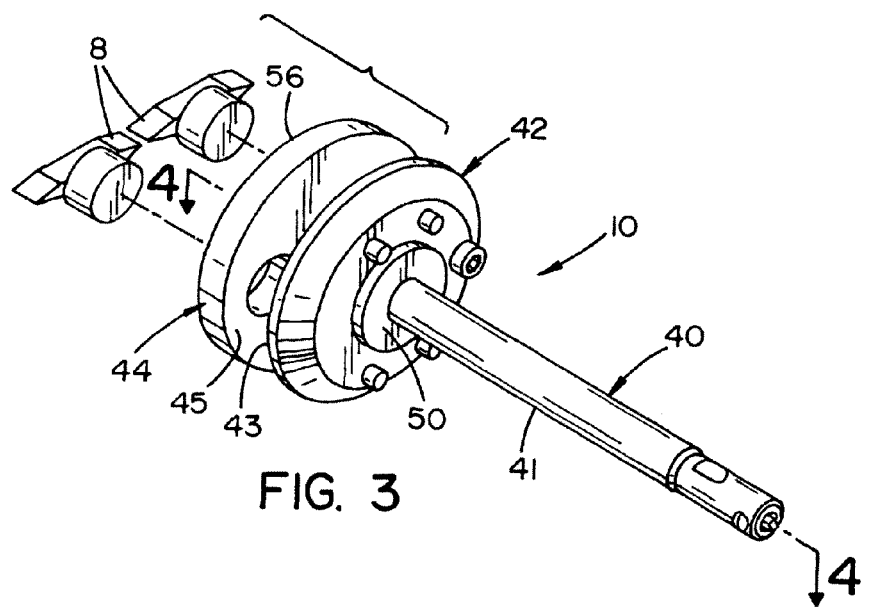
FIG. 3 is a one piece or unitary car design according to the present disclosure.

Referring now to FIGS. 2 and 3, there is shown perspective views of a car 11 according to the prior art (FIG. 2) and a car 10 according to the present disclosure (FIG. 3). The strand carriers 4, mountable upon respective cars 10, are comprised generally of a spindle, bobbin, clutch, and tension controller. Cars 10 usually extend horizontally away from, or perpendicular to, a mounting deck and are driven by the movements of horn gears 12 and shoes 8.

Figure 4:
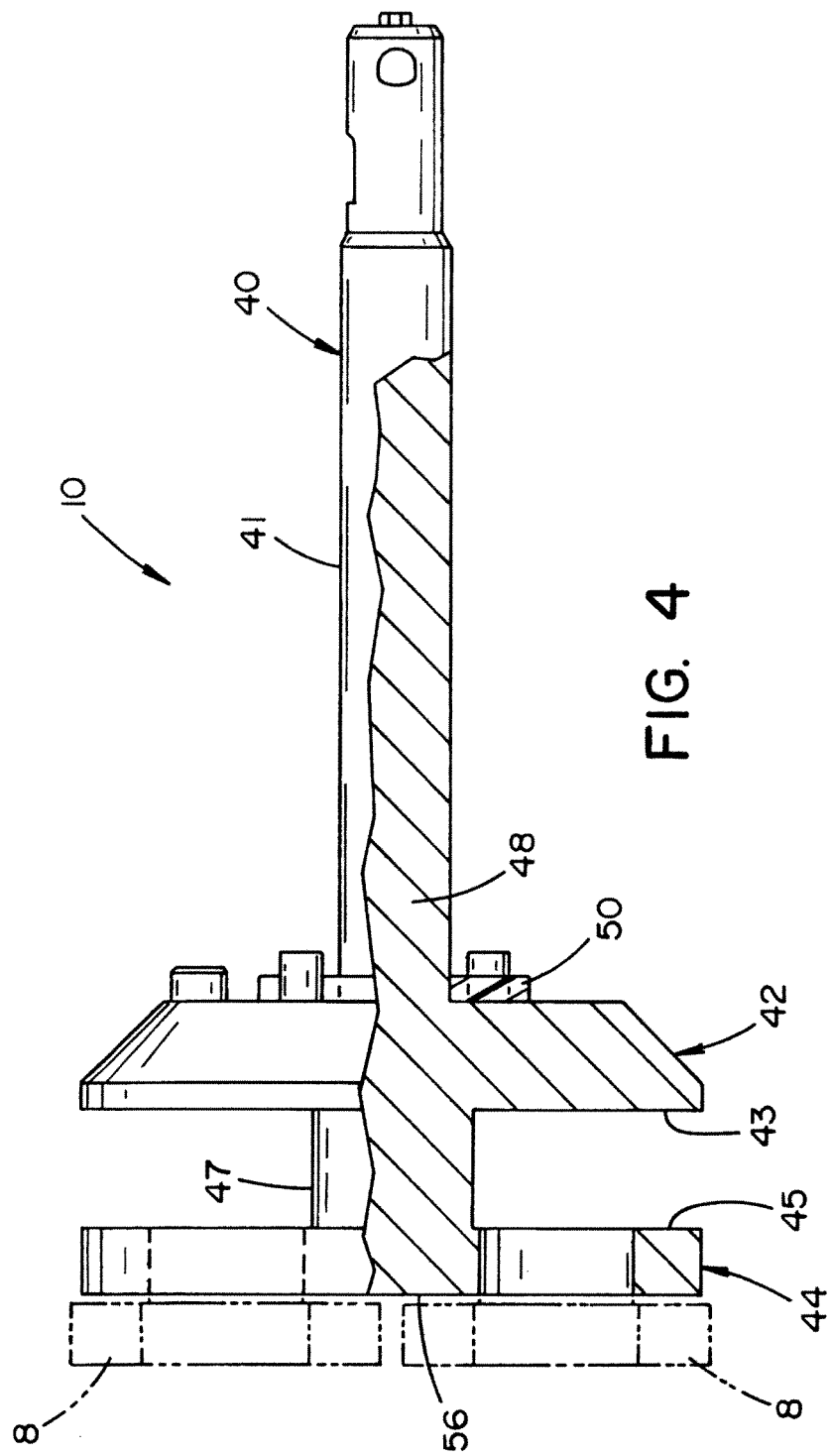
FIG. 4 is a cross sectional view of the car taken along line 4-4 of FIG. 3.

Referring now to FIGS. 3 and 4, wherein in one embodiment a rotatable mounting means includes the car 10 comprising a unitary central post 40, a mounting base or platform 42, and a foot 44. The central post 40 can include a carrier mounting portion 41 and a flange portion 47. It is to be appreciated that a diameter of the flange portion 47 is greater than a diameter of the carrier mounting portion 41. The car 10 can comprise a single one-piece or unitary component design 48 (FIG. 4) and/or can comprise a single unitary component for the central post 40. The strand carrier 4 can be carried on the car 10 with the base of the spindle resting on a raised surface 50 of the unitary member, and with the carrier mounting portion 41 received within the spindle shaft. The strand carrier 4 can be freely rotatable with respect to the car 10 about axis 14, and can be axially fixed along axis 14 by top washers and a top bolt engaged in threads at the top end of the central post 40. It is to be appreciated that the central post 40 can extend from the bottom plane surface 56 of the foot 44 (i.e. penetrates the foot completely) through the mounting base 42 wherein the foot 44 and the platform 42 are spaced from one another and both provide support to the post 40. Each of the cars 10 can comprise the unitary central post 40, mounting base 42, and foot 44, wherein the central post 40 extends from a bottom plane surface of the foot 44 through the foot 44 and the mounting base 42. Through a press fit arrangement between the components, the foot 44 and the mounting base 42 provide support to the central post 40, and vice versa.

The car 10 can be a machined component rather than a forged component. This machining process reduces cost of manufacture and the unitary component increases durability and reliability.

Figure 5:
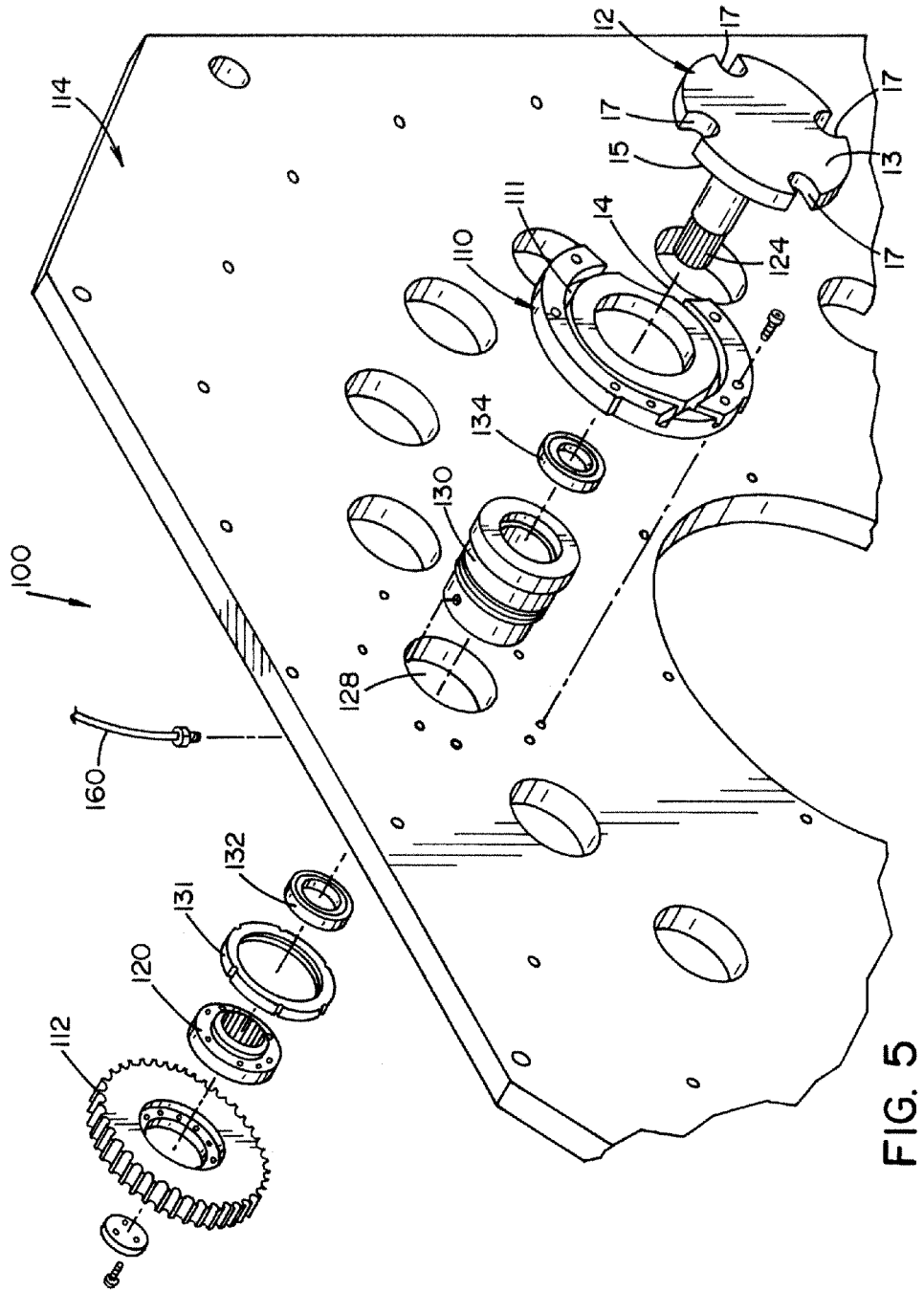
FIG. 5 displays an exploded view of the mounting arrangement comprising the horn gear, modular track, back gear, and the deck plate.

FIG. 5 shows an exploded view of the mounting arrangement 100 comprising the horn gear 12, modular track 110, back gear 112, and the deck plate 114. Rather than having one large track extending around the deck plate, what is shown is a series of individual modules or track plates 110 for mounting and movement of the shoes 8 and cars 10 therearound. Each of the modules 110 is mountable onto a single deck plate 114.

The mounting arrangement or assembly can further include a hub 120 which can be mounted within the back gear 112. The hub 120 can receive a spline 124 attached to the horn gear 12 in order to provide rotation thereto as the back gear 112 is rotated. Thus, the horn gears 12 are mounted to the back gears 112 through apertures 128 in the deck plate 114. The openings or apertures 128 in the deck plates 114 provides the mounting positions for bearing housings 130. The bearing housings 130 can be retained by bearing housing locking ring 131. The bearing housing 130 can retain ball bearings or tapered roller bearings 132, 134 on each side of the deck plate 114. The back gears 112 can be timed to provide the proper movement of the horn gears 12. The bearing housing 130 can be in a non-sealed arrangement with the horn gear 12, modular track plates 110, bearings 132, 134, hub 120, and back gear 112.

Figure 7:
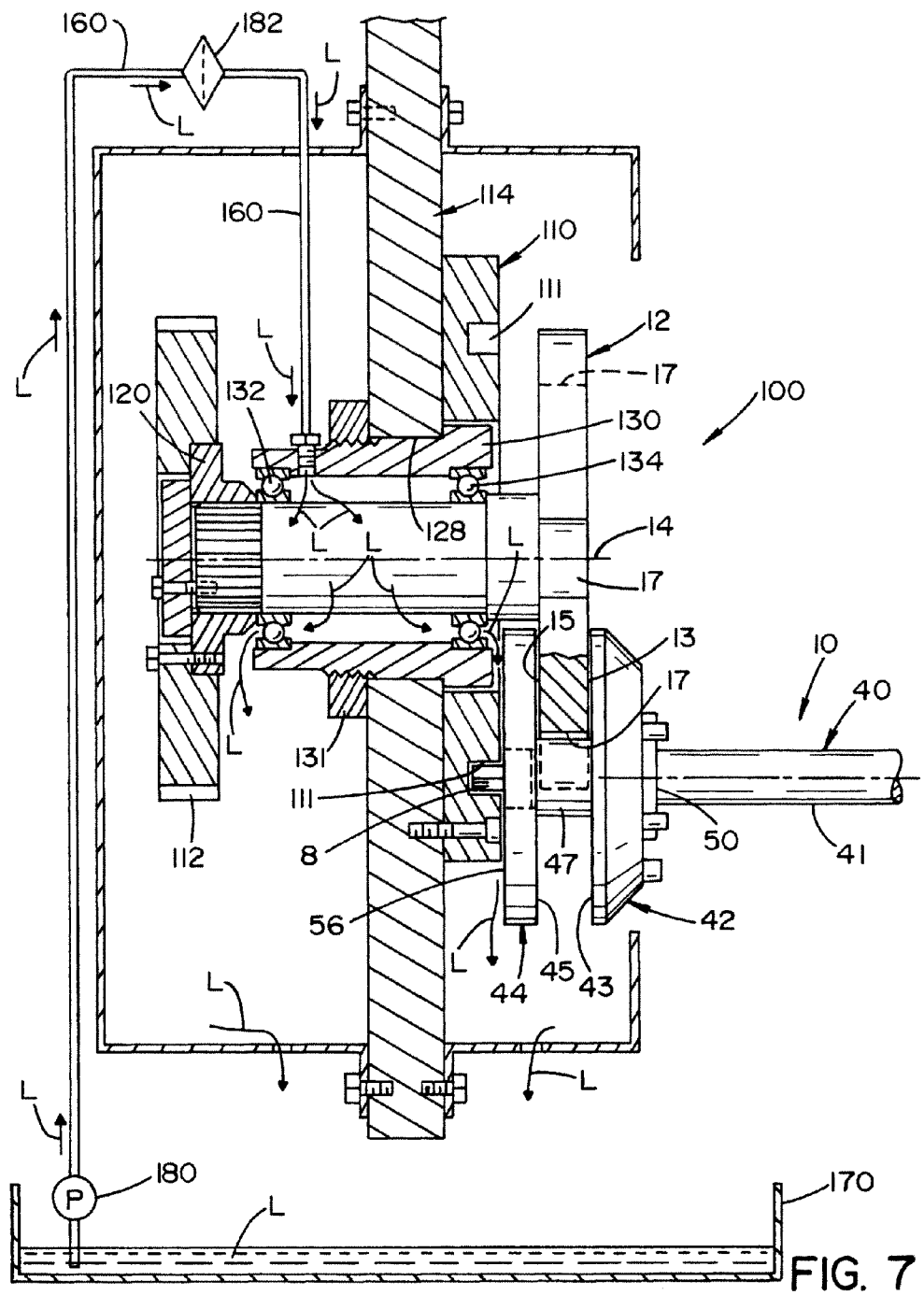

The non-sealed bearing arrangement allows lubricant L to flow to the front and back of the mounting arrangement on both sides of the deck plate 114 while lubricating the aforementioned components along its path (refer to FIG. 7).

In the arrangement shown in the attached figures, the horn gears 12 are typically above the tracks (i.e. modular tracks) 110. It is to be appreciated that each horn gear 12 provides support for two associated carriers 4. The support of the carriers 4 is maintained by the horn gears 12. The modular tracks 110 provide the guides 111 for the movement of the shoes 8, cars 10, and carriers 4.

Maintaining clearances for the movement of the carriers 4 is important to the operation of the braiding machine 2. The location of the horn gears 12 on the deck plate 114, and also the height of horn gears 12, should be carefully positioned for optimum performance. The heights of the plurality of horn gears 12 are positioned to be very close to the same plane. One method for accomplishing the proper placement of the horn gears 12 is to ship the bearing housings 130, deck plate 114, and horn gears 12 preassembled. The clearance of the bearings 132, 134 can be set in the preassemblies. Further adjustments can be made with shims to get all the horn gears 12, i.e. the tops of the horn gears, all in the same plane. The shims can be placed around the bearing housing 130 and can be positioned such that the shims reside between a flange on the bearing housing 130 and the deck plate 114. For example, for a 24 carrier braiding machine, 12 horn gears can be preassembled.

The carriers 4 can be supported nearly entirely on the horn gear 12 by the use of the cars 10. Each car 10 has two flange surfaces 43, 45, along with the shank 47 therebetween, wherein one flange surface 43 rests on the top side 13 of the horn gear 12 and the other flange surface 45 is on the bottom side 15 of the horn gear 12. Thus, the flanges 43, 45 of the car 10 partially encapsulate the horn gear 12 and assist in providing support to the entire carrier 4. All of the overturning moments of the rotating carriers 4 are directed on the horn gear 12.

Although not shown, it is to be appreciated that the cars 10 carry the carriers 4 and follow a sinuous path around the center of the deck plate 114. The cars 10 move independently around successive tracks 111 similar to the path of a railroad car.

As the horn gears 12 rotate, the shank 47 is moved around by one of the slots 17 on the periphery of the horn gear 12. As two slots 17 from two adjacent horn gears come together, the associated shoes 8, car 10, and carrier 4 slide from one horn gear to the other directionally successive adjacent horn gear. For a fractional period of time, i.e. at crossover point, the carrier 4 is actually supported by two horn gears. In this manner, the successive tracks 111 and slots 17 guide the shoes 8, cars 10, and carriers 4 while the horn gears 12 support and drive the same.

Some of the parts described above can be specifically treated for improved hardness. For example, the horn gear 12, the car 10, the shoes 8, and the run 111 in the track plates 110 can be heat treated steel, machined to specifications, and finally finished with a nitriding process. The nitriding process (i.e. low temperature process in the range of 1000 degrees F.) can penetrate from about 0.001 to about 0.002 of an inch in depth from the exterior of the parts. The resulting surface hardness includes a hardness rating in the range of 60 C to 75 C Rockwell. The improved hardness is a result of using the nitriding process as the final step in the part preparation. The nitriding process results in a precision finish and eliminates a grinding process as the final step in part preparation.

The nitriding process can comprise a ferritic nitrocarburizing (FNC) process. The FNC process is a range of case hardening processes that diffuse nitrogen and carbon into ferrous metals at sub-critical temperatures. The processing temperature ranges from 525 to 650 degrees Celsius, but usually occurs at around 565 degrees Celsius. At this temperature, steels and other ferrous alloys are still in a ferritic phase, which is advantageous compared to other case hardening processes that occur in the austentic phase. There are four main classes of ferritic nitrocarburizing: gaseous, salt bath, ion or plasma, and fluidized-bed.

Ferritic nitrocarburizing diffuses mostly nitrogen and some carbon into the case of a workpiece below the critical temperature, approximately 650° C. (1,202° F.). Under the critical temperature the workpiece's microstructure does not convert to an austenitic phase, but stays in the ferritic phase. The process is used to improve three main surface integrity aspects: scuffing resistance, fatigue properties, and corrosion resistance. It has the added advantage of inducing little shape distortion during the hardening process. This is because of the low processing temperature, which reduces thermal shocks and avoids phase transitions in steel. It is to be appreciated that the workpiece's underlying hardness (i.e. 20 C to 30 C Rockwell) remains relatively unchanged while the nitriding process adds an exterior surface (i.e. at a depth of 0.001 to 0.0002 inches) comprising an increased surface hardness in the range of 60 C to 75 C Rockwell. In addition, the other core properties of the parts undergoing the FNC process remain relatively unchanged.

Figure 6:
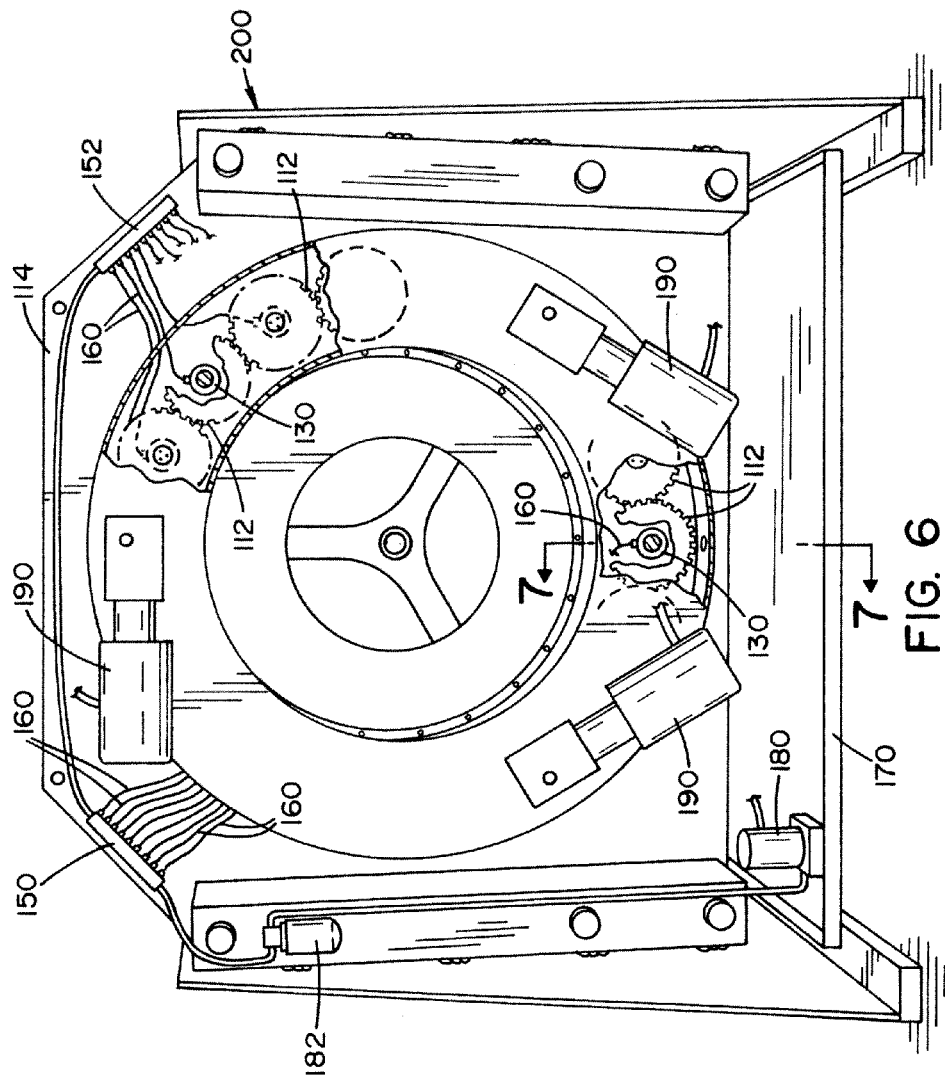
FIG. 6 displays a motor mounting arrangement and a lubrication system on the back of the deck plate wherein each motor drives one or more horn gears and wherein individual oil feed lines lubricate individual horn gear assemblies; and, FIG. 7 displays a cross sectional view of the horn gear assembly and the lubrication system for continuously lubricating an exemplary individual horn gear assembly.

Referring again to FIGS. 6 and 7, a lubricating apparatus and method is therein shown. The lubrication of the horn gear assemblies 100 comprises introducing oil L into each bearing housing 130 via its own supply of oil L. The oil L can be introduced in between the tapered roller bearings 132, 134. The oil L is metered into each spindle. Some of the oil L leaves through the bearing 134, in the front, and onto the track 111, while some of the oil L leaves through the bearing 132, in the back, and onto the back gear 112. The 'open or unsealed' lubrication system can enable or provide for a lower viscosity oil L to the bearings 132, 134. Oil can travel axially through the bearings (i.e. bearings are open) and can lubricate the track 111 in the front and the gears 112 in the back. The oil is distributed via a pair of manifolds 150, 152 that include a plurality of lubricant feeds 160. Each feed 160 can provide a supply of oil L directly to each horn gear assembly 100. The lubrication system comprises an open system including a collection tray or pan 170 (i.e. perforated metal reservoir) at the bottom of the frame for collecting the oil. A pump 180 re-circulates the oil from the reservoir to a filter 182 for reusing. The volume of oil L recirculation is in the range of 125 cc/minute. Referring now to FIG. 6, motors 190 on the back of the deck plate 114 are therein shown and are used to drive the horn gears 12. Each motor 190 can drive a plurality of horn gears 12. For example, a ratio of one motor 190 for six horn gears (i.e. 12 carriers).

The deck plate 114 can be attached to a frame 200, wherein the frame 200 can be supported by two stanchions (not shown). Each stanchion can support the frame in multiple locations. Each support point can be supported on a rubber bushing. The support point hole can accept a rubber bushing on each side of the frame. The frame is fully supported by the bushings. Thus, the plate is soft mounted to the stanchions.

Although certain embodiments of the disclosure have been shown in the drawings and described in the specification, it is to be understood that the disclosure is not limited thereto, is capable of modification, and can be rearranged without departing from the spirit and scope of the disclosure. For example, while gear trains comprising gears with conventional intermeshing teeth are shown and described for rotating the carrier spindles on their own axes, the trains may be composed of driving and driven elements having no teeth of the conventional type shown, but rather having cooperating friction surfaces but of a character to ensure against slippage therebetween as is essential, the terms "gears" and "intermeshing gears" encompassing such elements. Also, while rollers and roller tracks have been shown and described as the cooperative elements on the rotors and carrier spindles for maintaining the latter in the pockets of the rotors, other track followers may be employed, such as shoes or the like.

Operation of braiding machine 2 causes cars 10 continuously to rotate in alternating directions with respect to the workpiece. Rotation of strand carrier 4 on the mounting platform will cause the strand carrier to rotate oppositely with respect to car 10, and thus not to rotate with respect to the workpiece. Although not shown, the tension in the strand between the workpiece and an upper strand guide will tend to hold strand carrier 4 in a constant radial alignment with the workpiece.

Also, operation of braiding machine 2 causes strand carrier 4 to move alternately toward and away from the workpiece as strand carrier 4 follows alternating semi-circular paths in a revolution around the workpiece. Accordingly, the rate at which the strand is withdrawn must increase as strand carrier 4 moves radially away from the workpiece, and must decrease upon the return motion, both while remaining under a substantially constant tension to be wrapped around the workpiece by the overall revolving motion.

Although not shown, it is to be appreciated that as strand carrier 4 begins a path of travel moving radially away from the workpiece, bobbin is constrained from rotation on spindle by a clutch plate, as are all the components constrained from relative rotation while being free to rotate together as a unit about a central post. With bobbin so constrained, strand cannot unwind further from a wound supply. As carrier 4 moves radially away from the workpiece the strand output is supplied from the lengths of strand found between a pair of pulleys of a tension controller. As the initial output causes the lengths of strand between the pulleys to decrease, a floating member is caused to move toward an end member along a sleeve against the biasing force of main springs.

Other variations of the structure strand carrier 4 include substitution of the pulleys and the lower strand guide with apertures, eyelets, or any suitable means enabling the strand to be withdrawn from the bobbin and through the tension controller along a path providing a strand tension force between the floating member and the end member which is radially balanced to act substantially coincidentally against the axial spring force without producing a moment therebetween.

The invention claimed is:
1. A braiding machine, comprising:
a support member;
a series of drivers carried by said support member arranged in a circle around a braiding point;

a mechanism to rotate adjacent of said drivers in opposite directions;

a series of strand supply carrier spindles and a plurality of cars for mounting of an associated said spindle to be driven by said drivers for travel in serpentine intersecting paths in opposite directions around said braiding point;

each of said plurality of cars comprises a unitary central post, a mounting base, and a foot;

said central post extends from a bottom plane surface of said foot through said foot and said mounting base, wherein said foot and said mounting base are spaced from one another and both provide support to said post;

said car is formed from heat treated steel having a hardness from about 20 C to about 30 C Rockwell;

said car is machined to a specification from said heat treated steel and then treated to another heat treating operation;

said another heat treating operation includes nitriding for increased surface hardness and tolerance adherence of said car; and, said surface hardness is at least 60 C Rockwell.

2. A braiding machine according to claim 1, wherein said surface hardness is from about 65 C to about 75 C Rockwell.

3. A braiding machine according to claim 1, wherein said drivers further include:

a plurality of horn gears and shoes;

said horn gears support said cars and said shoes;

said horn gears and said shoes are formed from said heat treated steel having a hardness from about 20 C to about 30 C Rockwell;

said horn gears and said shoes are machined to a specification from said heat treated steel and then treated to another heat treating operation;

said another heat treating operation includes nitriding for increased surface hardness and tolerance adherence of said horn gears and said shoes; and, said surface hardness is at least 60 C Rockwell.

4. A braiding machine according to claim 3, wherein said surface hardness is from about 65 C to about 75 C Rockwell.

5. A braiding machine according to claim 3, wherein said nitriding includes a low temperature heating process in the range of 1000 degrees F. which converts a surface compound from one to another while minimizing a volume change and maintaining said specification to the exterior of said cars, said horn gears, and said shoes.

6. A braiding machine according to claim 3, wherein said nitriding includes a low temperature heating process less than 1,200 degrees F. which converts a surface compound from one to another while minimizing a volume change and maintaining said specification to the exterior of said cars, said horn gears, and said shoes.

7. A braiding machine according to claim 6, wherein the nitriding process further includes a ferritic nitrocarburizing (FNC) process; and, said FNC process includes diffusing nitrogen and carbon into ferrous metals at a processing temperature range from about 525 degrees Celsius to about 650 degrees Celsius.

8. A braiding machine according to claim 7, wherein said processing temperature range is from about 545 degrees Celsius to about to 585 degrees Celsius.

9. A braiding machine according to claim 8, wherein in said processing temperature range the ferrous metals are in a ferritic phase.

10. A braiding machine, comprising:

a support member;

a series of drivers carried by said support member arranged in a circle around a braiding point;

a mechanism to rotate adjacent of said drivers in opposite directions;

a series of strand supply carrier spindles and a plurality of cars for mounting of an associated said spindle to be driven by said drivers for travel in serpentine intersecting paths in opposite directions around said braiding point;

each of said plurality of cars comprises a unitary central post, a mounting base, and a foot;

said central post extends from a bottom plane surface of said foot through said foot and said mounting base, wherein said foot and said mounting base are spaced from one another and both provide support to said post;

said car is formed from heat treated steel having a hardness from about 20 C to about 30 C Rockwell;

said car is machined to a specification from said heat treated steel and then treated to another heat treating operation;

said another heat treating operation includes nitriding for increased surface hardness and tolerance adherence of said car; and, wherein said nitriding includes a low temperature heating process from about 800 degrees F. to about 1,200 degrees F. which converts a surface compound from one to another while minimizing a volume change and maintaining said specification to the exterior of said cars, said horn gears, and said shoes.

11. A braiding machine according to claim 10, wherein said surface hardness is at least 60 C Rockwell.

12. A braiding machine according to claim 10, wherein said nitriding includes a low temperature heating process from about 900 degrees F. to about 1,100 degrees F.

13. A braiding machine according to claim 10, wherein the nitriding process further includes a ferritic nitrocarburizing (FNC) process; and, said FNC process includes diffusing nitrogen and carbon into ferrous metals at a processing temperature range from about 525 degrees Celsius to about 650 degrees Celsius.

14. A braiding machine according to claim 13, wherein said processing temperature range is from about 545 degrees Celsius to about to 585 degrees Celsius.

15. A braiding machine according to claim 13, wherein in said processing temperature range the ferrous metals are in a ferritic phase.

16. A braiding machine, comprising:

a support member;

a series of drivers carried by said support member arranged in a circle around a braiding point;

a series of strand supply carrier spindles and a plurality of cars;

each of said plurality of cars comprises a unitary central post, a mounting base, and a foot;

said central post extends from a bottom plane surface of said foot through said foot and said mounting base, wherein said foot and said mounting base are spaced from one another and both provide support to said post;

said car is formed from heat treated steel having a hardness from about 20 C to about 30 C Rockwell;

said car is machined to a specification from said heat treated steel and then treated to another heat treating operation;

said another heat treating operation includes nitriding for increased surface hardness and tolerance adherence of said car; and, wherein said nitriding includes a low temperature heating process from about 800 degrees F. to about 1,200 degrees F.

17. A braiding machine according to claim 16, wherein said surface hardness is at least 60 C Rockwell.

18. A braiding machine according to claim 16, wherein said nitriding includes a low temperature heating process from about 900 degrees F. to about 1,100 degrees F.

19. A braiding machine according to claim 16, wherein the nitriding process further includes a ferritic nitrocarburizing (FNC) process; and,
    said FNC process includes diffusing nitrogen and carbon into ferrous metals at a processing temperature range from about 525 degrees Celsius to about 650 degrees Celsius.

20. A braiding machine according to claim 19, wherein said processing temperature range is from about 545 degrees Celsius to about to 585 degrees Celsius.

21. A braiding machine according to claim 19, wherein in said processing temperature range the ferrous metals are in a ferritic phase.

22. A braiding machine, comprising:
    a series of strand supply carrier spindles and a plurality of cars for mounting of an associated said spindle;
    each of said plurality of cars comprises a unitary central post, a mounting base, and a foot;
    said car is formed from heat treated steel having a hardness from about 20 C to about 30 C Rockwell;
    said car is machined to a specification from said heat treated steel and then treated to another heat treating operation;
    said another heat treating operation includes nitriding for increased surface hardness and tolerance adherence of said car; and,
    wherein said surface hardness is greater than 70 C Rockwell.

23. A braiding machine according to claim 22, wherein said nitriding includes a low temperature heating process from about 800 degrees F. to about 1,200 degrees F. which converts a surface compound from one to another while minimizing a volume change and maintaining said specification to the exterior of said cars, said horn gears, and said shoes.

24. A braiding machine according to claim 22, said central post extends from a bottom plane surface of said foot through said foot and said mounting base, wherein said foot and said mounting base are spaced from one another and both provide support to said post.

25. A braiding machine according to claim 22, wherein the nitriding process further includes a ferritic nitrocarburizing (FNC) process; and,
    said FNC process includes diffusing nitrogen and carbon into ferrous metals at a processing temperature range from about 525 degrees Celsius to about 650 degrees Celsius.

* * * * *